United States Patent

Teitelbaum

[15] 3,673,857
[45] July 4, 1972

[54] DEVICE FOR DETECTING LEAKS IN VACUUM OR PNEUMATIC PRESSURE LINES

[72] Inventor: Bernard R. Teitelbaum, Birmingham, Mich.

[73] Assignee: The Bendix Corporation

[22] Filed: Aug. 6, 1970

[21] Appl. No.: 61,593

[52] U.S. Cl. ................................73/40.5 A, 73/69, 73/71.4
[51] Int. Cl. .........................................................G01m 3/24
[58] Field of Search ......................73/37, 40, 40.5 R, 52, 69, 73/40.5 A, 71.4; 340/239, 242; 310/8.3, 8.7

[56] References Cited

UNITED STATES PATENTS

| | | | |
|---|---|---|---|
| 3,254,528 | 6/1966 | Michael | 73/40.5 R |
| 2,661,622 | 12/1953 | Severs | 73/71.4 |
| 3,066,232 | 11/1962 | Branson | 310/8.7 |
| 3,033,027 | 5/1962 | Perls et al. | 310/8.7 |

*Primary Examiner*—Louis H. Prince
*Assistant Examiner*—William A. Henry, II
*Attorney*—James E. Stephenson, William F. Thornton and Plante, Hartz, Smith and Thompson

[57] ABSTRACT

Leak detector apparatus comprising a sensor which can be clamped on a vacuum or pneumatic pressure line to detect the presence of a leak in the line near the clamping location, and an indicator coupled to the sensor to indicate the intensity of signals transmitted by the sensor. The sensor includes a transducer formed of piezoelectric material for transducing to an electric signal the low-amplitude, high-frequency random-force component applied to the clamping surfaces by the turbulence noise which results from the leak. Certain embodiments of the apparatus have a sensor which also includes a mechanical resonator for amplifying the electrical signal that is transmitted.

9 Claims, 5 Drawing Figures

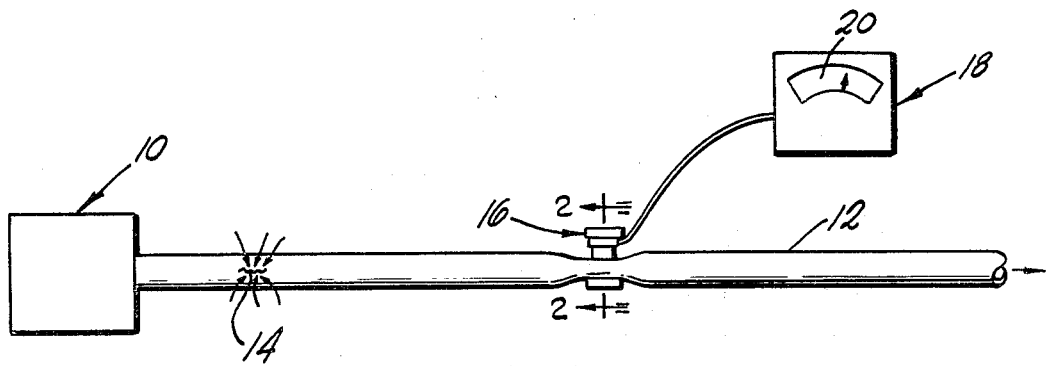
FIG. 1
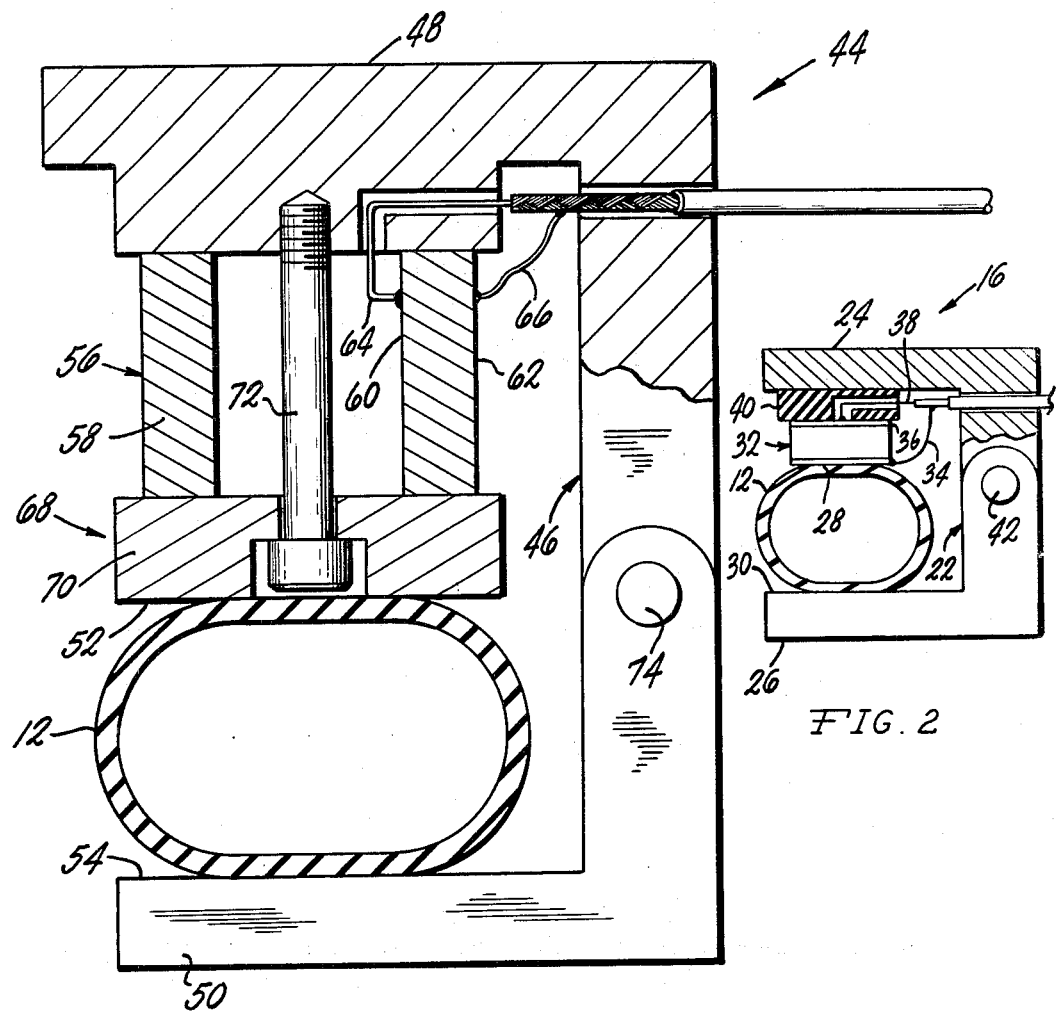
FIG. 2
FIG. 3
INVENTOR
BERNARD R. TEITELBAUM
BY
*Olsen and Stephenson*
ATTORNEYS

INVENTOR
BERNARD R. TEITELBAUM

BY
*Olsen and Stephenson*
ATTORNEYS

DEVICE FOR DETECTING LEAKS IN VACUUM OR PNEUMATIC PRESSURE LINES

BACKGROUND OF THE INVENTION

The present invention relates to devices that are responsive to turbulence noise signals for detecting leaks in vacuum or pneumatic pressure lines.

Various devices of this general character have been developed in the past, but they leave much to be desired from the standpoint of providing a simple, unitary sensor which can be economically produced and easily operated.

The present invention has overcome the shortcomings of the prior art, and according to one embodiment of the present invention a device is provided for detecting a leak in vacuum or pneumatic pressure lines comprising a turbulence noise sensor in the form of clamp structure which has arms defining clamping surfaces for clamping onto one of the conduits. One of the arms includes a transducer which is operable to transduce a low-amplitude, high-frequency, random-force component to an electrical signal. The transducer utilizes a piezoelectric material for transducing the force component to an electrical signal. An indicator is electrically coupled to the transducer for indicating the strength of the electrical signal produced.

In other embodiments of the invention the one arm of the clamping structure includes a mechanical resonator arranged to amplify the output signal of the sensor. The mechanical resonator includes a mass which is responsive to the acoustic vibrations produced by a leak and an elastic member to which the mass is connected. Normally, the elastic member will be the piezoelectric material which forms the transducer. In embodiments of the invention of this character, the mechanical resonator will be tuned to have high sensitivity in the frequency band found empirically to be optimum for leak detection in a specific vacuum or pneumatic system.

Accordingly, it is an object of the present invention to provide an improved device for detecting a leak in vacuum or pneumatic pressure conduits.

Other objects of this invention will appear in the following description and appended claims, reference being had to the accompanying drawing forming a part of this specification wherein like reference characters designate corresponding parts in the several views.

BRIEF DESCRIPTION OF THE DRAWING

FIG. 1 illustrates an embodiment of the present invention as used with a vacuum operated accessory connected to a vacuum source by a length of tubing;

FIG. 2 is an enlarged section taken on the line 2—2 of FIG. 1, showing details of construction of one form of sensor that can be used with the present invention;

FIG. 3 is an enlarged side elevational view, partly in section, showing another embodiment of the present invention in which a mechanical resonator forms part of the sensor;

DESCRIPTION OF THE PREFERRED EMBODIMENTS

Figure 5:
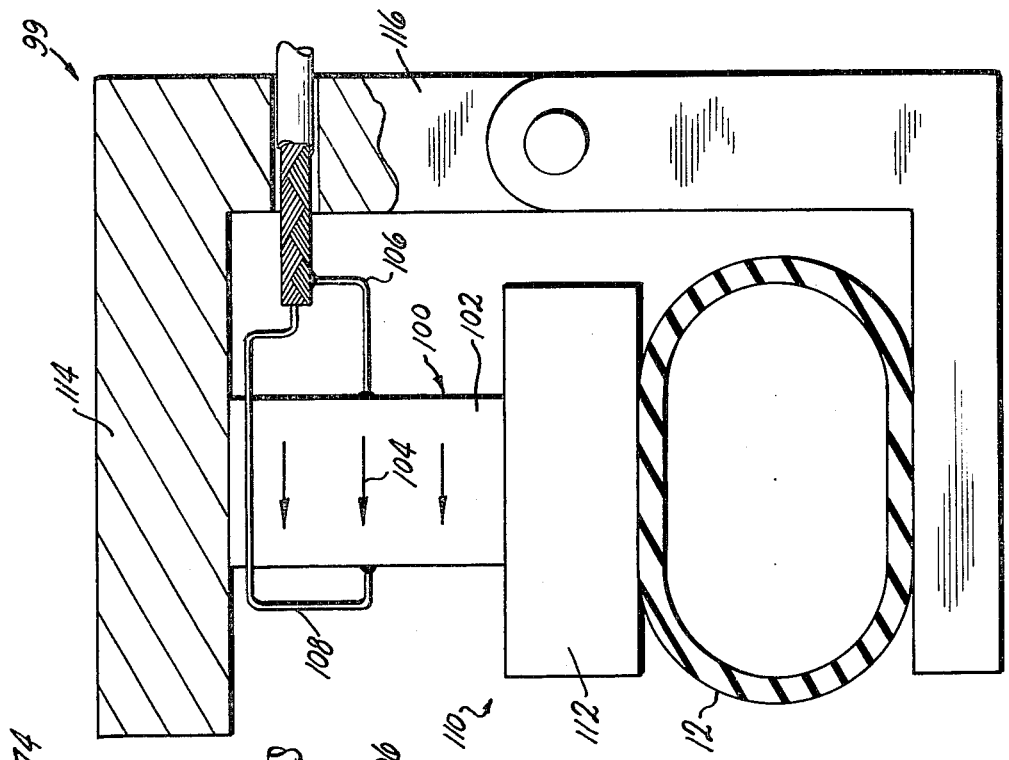
FIG. 5 is another view similar to that of FIG. 3, showing still another embodiment of the sensor.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the various forms of the invention will be described in greater detail. FIG. 1 illustrates schematically a typical leak detection situation that may arise. A vacuum operated accessory 10 is shown connected to a vacuum source (not shown) by a length of flexible tubing 12.

In the event the accessory 10 becomes inoperative, it may be desired to know if the cause is a leak in the tubing 12, and if so, where the leak is. The turbulence noise sensor 16 is then clamped on the tubing 12, as shown, and if a leak is present, the turbulence noise from the leak opening 14 will propagate through the gas in the tubing 12 and through the tubing wall. Provided that the sensor 16 is reasonably close to the leak, the turbulence noise will apply a low-amplitude, high-frequency, random-force component to the clamping surfaces of the sensor 16. This random force is transduced by the sensor to an electrical signal, and an indicator 18 processes the electrical signal by filtering and amplifying it. A visual display is presented, such as a meter reading 20, indicating the strength of the turbulence noise signal. Thus, by moving the sensor 16 along the length of the flexible tubing 12, the location of the leak opening 14 can readily be found. As the sensor 16 is clamped at different locations along the tubing 12, the noise indication will increase or decrease, depending on whether the sensor 16 is closer to or farther from the leak opening 14. It can be seen that a few applications of the sensor 16 along the tubing length will be sufficient to determine if a leak is present, and the approximate location of the leak.

The structural details of the turbulence noise sensor 16 are illustrated schematically in FIG. 2. As there shown, the sensor 16 includes a clamp structure 22 which has arms 24 and 26 defining clamping surfaces 28 and 30 for clamping onto the conduit 12. The one arm 24 includes a transducer 32 made of piezoelectric or piezoceramic material and which is operable to transduce a low-amplitude, high-frequency, random-force component to an electrical signal. The transducer has a bottom electrode surface which defines the clamping surface 28 to which a ground connection 34 is electrically connected. The transducer 32 has an upper electrode surface 36 to which the shielded cable 38 is electrically connected. The shielded electrical cable 38 extends through the rigid electrical insulator 40 to which the electrode surface 36 is secured, and the insulator in turn is secured to an interior portion of the arm 24. The arms 24 and 26 are pivotally connected at 42 to facilitate clamping the clamp structure onto the tubing 12.

As indicated above, the leakage in a tubing 12 is indicated by the turbulence noise from the fluid jet associated with the leak opening 14. This noise may have the major portion of its acoustic power in frequency bands higher than the frequency limit of human ears. The turbulence noise is propagated from the site of the leak to the leak detector sensor 16 through the fluid medium in the line as well as through the tubing wall.

The capability of a leak detector sensor to detect a very small or a distant leak is limited by two factors; (a) the sensitivity of the device, i.e. the ability to produce a large electrical output signal for a small acoustic input signal, and (b) the selectivity of the device, which is the characteristic of rejecting extraneous background acoustic signals and accepting only those acoustic signals related to the leak phenomenon.

In a practical device, the sensitivity and selectivity are often interrelated, so that changing one may also change the other. Also, perfect selectivity is not possible, but can be approached. One way of doing this is by frequency bandpass filtering. First, it is necessary to find a narrow frequency band in which leaks have a significant portion of their acoustic power, and in which the background acoustic power is relatively low. This is best done empirically. Second, a means is provided to attenuate or suppress the frequency components of signals falling outside the bandpass range. In this way, there is high probability that the filtered signal reflects the presence or absence of a leak.

One arrangement for obtaining sensitivity and selectivity is illustrated in FIG. 1, where bandpass filtering and amplification is accomplished in the electrical signal regime. The leak detector sensor 16 converts acoustic signals to electrical signals in an approximately uniform manner over a wide frequency range. The indicator 18 performs the bandpass filtering and amplification in known manner, the details of which will not be described in detail because such filtering and amplification means are known in the art.

The present invention also relates to a resonant mode sensor which accomplishes bandpass filtering and moderate amplification within itself. Attention is next directed to FIG. 3, which shows schematically a form of resonant mode sensor. In this arrangement a mechanical resonance is provided intentionally to magnify the sensor output signal. The sensor 44 is provided having a clamp structure 46 which has arms 48 and 50. The arms define clamping surfaces 52 and 54 for clamping onto the conduit 12. The one arm 48 includes the transducer 56 which is operable to transduce a low-amplitude, high-frequency, random-force component to an electrical signal. The transducer 56 comprises a cylindrical elastic member 58 made of piezoelectric material, and in the disclosed form comprises a piezoceramic cylinder which has radially inner and outer electrode surfaces 60 and 62 to which the shielded cable 64 and the ground cable 66, respectively, are connected.

The piezoceramic cylinder 58 has the property of developing a voltage or electric charge transfer between its electrode surfaces as the cylinder is elastically deformed. The frequency of the a. c. electrical voltage or the time rate of change of charge is the same as the frequency of oscillating deformation of the cylinder.

In this form of the invention, the one arm 48 also includes a mechanical resonator 68 for amplifying the output signal of the sensor 44. The resonator 68 includes the mass or clamping shoe 70 which defines the one surface 52, and the piezoceramic cylinder 58 and the tie bolt 72 form elastic members operably associated with the mass or clamping shoe 70 of the resonator 68. It will be observed that the tie bolt 72 secures the clamping shoe 70 and the piezoceramic cylinder 58 to an inner portion of the arm 48. In this embodiment of the invention the arms 48 and 50 are pivotally connected at 74 to facilitate clamping the sensor 44 onto the tubing 12.

If the force exerted on the sensor by the vacuum line in FIG. 1 were sinusoidal and of a single frequency, and if the frequency were slowly varied, the electrical signal versus frequency would appear graphically as an electrical signal having a much higher amplitude in a narrow frequency band around the resonant frequency than at any other frequency. In this way, the sensor would function as a bandpass filter. The amplification phenomenon occurs at the resonant frequency because over many cycles of the exciting force, the stored energy in the vibrating sensor system gradually builds up to a relatively high level. Thus, relatively large amplitude signals are available from the piezoceramic cylinder.

However, the force exerted on the sensor due to the turbulence noise associated with a leak is not sinusoidal and of a single frequency. Rather, its wave form appears to be random in time. Actually, it will be found that over some finite interval of time, frequency components are found in a continuous range. The resonance principle operates nevertheless, and the electrical signal from the sensor will be high when exciting frequencies around the resonant frequency are present, and the signal will be low when there are no exciting frequencies around the resonant frequency. By empirical selection of the mass 70, and the elastic members 58 and 72, a resonator can be incorporated into the sensor 44 so that a desired resonant frequency will be present to provide a high electrical signal corresponding to exciting frequencies produced by a leak in tubing 12.

Figure 4:
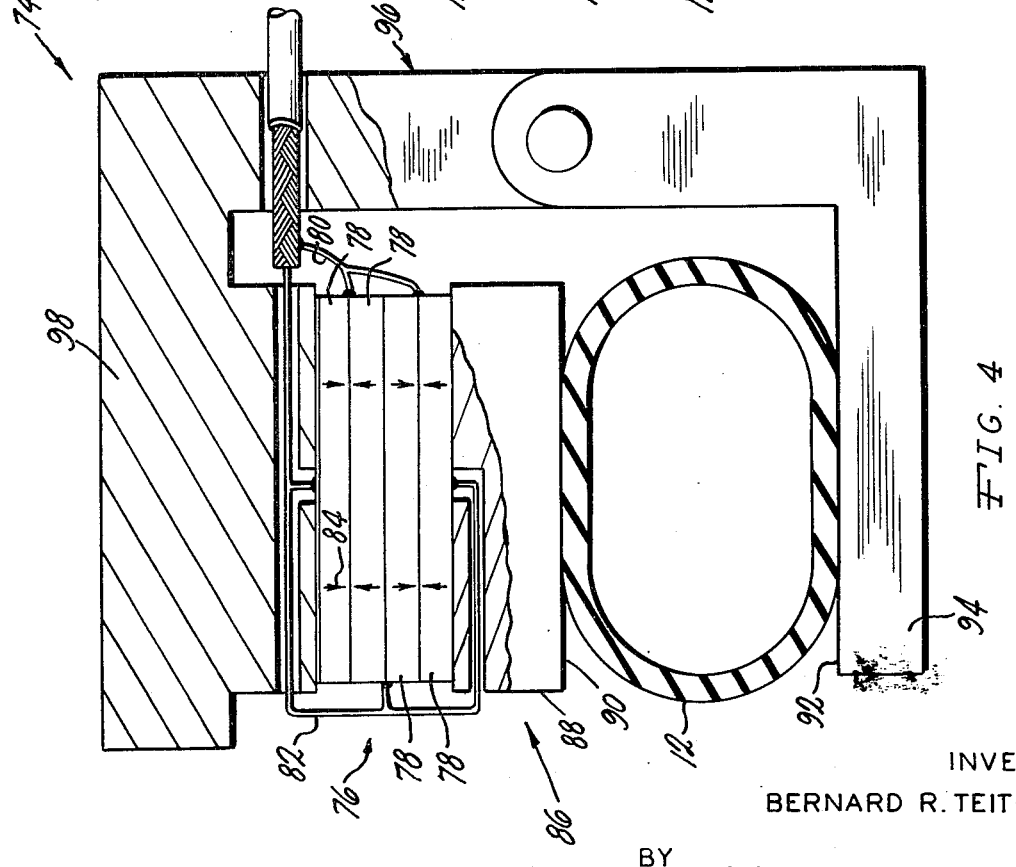
FIG. 4 is a view similar to that of FIG. 3, and showing still another embodiment of the sensor.

There are other possibilities for arranging the elastic member and masses of a resonant mode sensor besides the arrangement illustrated in FIG. 3. One such other arrangement is shown in FIG. 4, wherein the sensor 74 is provided with a transducer 76 which includes a stack of piezoceramic plates 78 arranged with their directions of poling and electrical connections such that the electrical signals from each of the four plates is additive at the output. Thus, the ground connections 80 are connected to the one set of electrode surfaces, and the shielded cable 82 is connected to the other set of electrode surfaces. In the illustration, the arrows 84 denote the poling direction.

The resonator 86 includes the clamping shoe or mass 88 which defines one of the clamping surfaces 90 and which utilizes the piezoceramic plates 78 as the elastic member of the resonator. The other clamping surface 92 is defined by the arm 94 of the clamp structure 96, and the other arm of the clamp structure is indicated by the reference number 98.

Still another arrangement of an elastic member and associated masses in a resonant mode sensor 99 is disclosed in FIG. 5. As is there shown, the transducer 100 is in the form of a piezoelectric bar 102 which has its electrode surfaces perpendicular to the poling direction indicated by the arrows 104. The ground connection 106 is connected to one of the electrode surfaces, and the shielded cable 108 is connected to the other electrode surface. As in the embodiment illustrated in FIG. 4, the resonator 110 comprises the mass or clamping shoe 112 which is affixed to the elastic bar formed by the piezoelectric material 102 which in turn is affixed to an inner portion of one arm 114 of the clamping structure 116.

Other variations can be made in the sensor construction without departing from the present invention. Thus, in the embodiment of the invention shown in FIG. 4, the four plates are electrically in parallel. For certain specific purposes they can also be arranged in series or in series parallel. Likewise, the clamping shoe mass and/or the clamp structure mass can be made very large or very small with respect to the mass of the elastic member. Also, it is to be understood that throughout the specification wherein the term "piezoceramic material" is used that this refers generally to polycrystalline structure such as barium titanate and lead zirconate titanate. Single piezoelectric crystals such as quartz can be used in a resonant mode sensor if they are suitably shaped, oriented and electroded.

I claim:

1. A device for detecting a leak in vacuum or pneumatic pressure conduits comprising a turbulence noise sensor in the form of a clamp structure which has arms defining clamping surfaces for clamping onto one of said conduits, one of said arms including a transducer which is operable to transduce a low-amplitude, high-frequency, random-force component to an electrical signal, and an indicator electrically coupled to said transducer for indicating the strength of the electrical signal, said transducer being located in said one arm so that one surface of the transducer defines one of said clamping surfaces of the clamp structure.

2. The device that is defined in claim 1, wherein said one arm includes a mechanical resonator to amplify the output signal of the sensor, said transducer being a part of said resonator, and said resonator defines one of said clamping surfaces of the clamp structure.

3. The device that is defined in claim 2, wherein said resonator includes at least one elastic member coupled to a mass to produce forced vibrations having large magnitudes at preselected frequencies, said transducer being said one elastic member.

4. The device that is defined in claim 3, wherein said transducer is a piezoceramic cylinder which has radially inner and outer electrode surfaces electrically coupled to said indicator, a clamping shoe which comprises said mass and defines the clamping surface of said one arm, and said resonator also includes a tie bolt which forms another elastic member located coaxially through said cylinder securing said cylinder between said clamping shoe and an inner end portion of said one arm.

5. The device that is defined in claim 3, wherein said transducer is a stack of piezoceramic plates which each have upper and lower electrode surfaces electrically coupled to said indicator, and said mass is a clamping shoe which defines the clamping surface of said one arm, said stack being said elastic member and located between said shoe and an inner portion of said one arm.

6. The device that is defined in claim 3, wherein said transducer is a bar of homogeneous piezoceramic material which has electrode surfaces on opposite sides electrically coupled to said indicator, and said mass is a clamping shoe which defines the clamping surface of said one arm, said bar being said elastic member and located between said shoe and an inner portion of said one arm.

7. The device that is defined in claim 2, wherein said transducer utilizes a piezoelectric material as said electric member and for transducing the force component to an electrical signal.

8. The device that is defined in claim 7, wherein said material is an electrically poled ceramic-type polycrystalline material.

9. A device for detecting a leak in vacuum or pneumatic pressure conduits comprising a turbulence noise sensor having an engagement surface for engaging one of said conduits, said sensor including a transducer formed of piezoelectric material which is operable in response to turbulence noise propagated through the wall of said one conduit to transduce a low-amplitude, high-frequency, random-force component to an electrical signal, and an indicator electrically coupled to said transducer for indicating the strength of the electrical signal, said turbulence noise sensor including a mechanical resonator to amplify the output signal of the sensor, and said resonator having a shoe which defines said engagement surface, said transducer being connected to said shoe and arranged to act in association with the shoe as an elastic member of the resonator.

* * * * *